3,057,138
APPARATUS FOR THE SEPARATION OF METALS FROM FLUIDS CONTAINING SAME
Frederick G. Huxster, Wilmington, Del., assignor, by mesne assignments, to Engelhard Industries, Inc., Newark, N.J., a corporation of Delaware
Filed Oct. 1, 1957, Ser. No. 687,549
3 Claims. (Cl. 55—486)

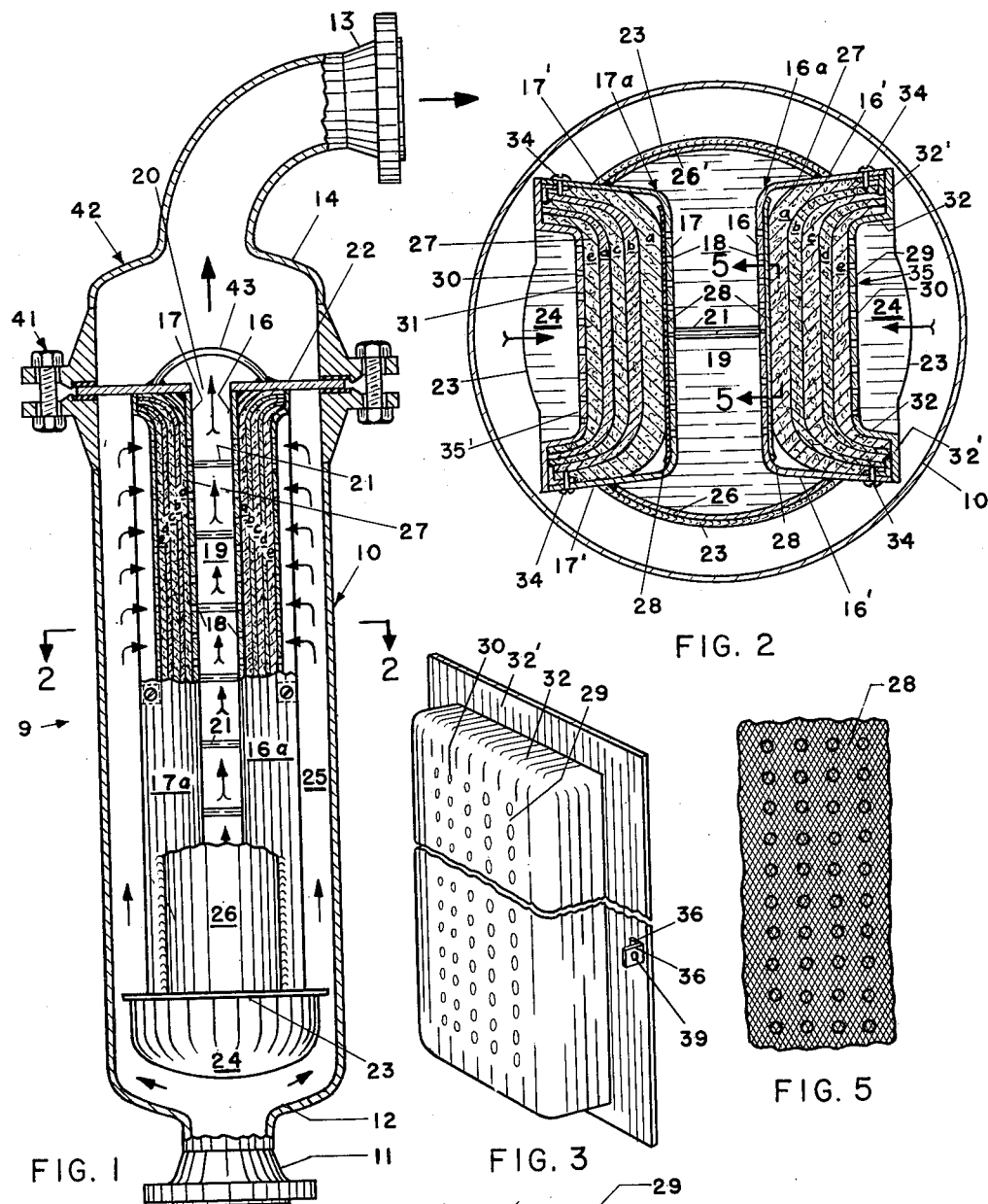

This invention relates to apparatus for the recovery of metals from fluids, particularly gases, containing same. In one aspect, this invention relates to the recovery of precious metals lost from a catalyst containing same while employed in the catalytic oxidation of ammonia. In another aspect, this invention relates to the recovery of precious metals from a gas stream containing same by filtration in a system containing a plurality of compressed layers of a fibrous refractory wool material as a filter body. In another aspect, this invention relates to apparatus containing a plurality of compressed refractory fibrous wool layers as a filter body for the removal of precious metals from a gas stream containing same. In still another aspect, this invention relates to apparatus for supporting a plurality of fibrous wool layers, as a filter body for separation of metal particles from a gas suspension of same, so that by-passing of the filter body by any of the gas stream is prevented.

The use of precious metals, particularly platinum, as an active component of conversion catalysts is well known. One such catalyst is that employed in the catalytic oxidation of ammonia to nitrogen oxides. Ammonia oxidation in one widely used form, involves the mixing of ammonia gas with oxygen or oxygen-containing gases such as air and the passage of the resulting gas mixture in contact with a platinum catalyst, generally platinum-rhodium gauze, at an elevated temperature such as from 900–1050° C., the ammonia being oxidized to nitrogen oxides which can then be converted to nitric acid by conventional methods, including a water absorption step. Air to ammonia gas volume ratios in the mixture charged to the catalytic reaction zone are generally in the order of from about 8:1 to about 10:1. The space velocity based on total gas feed is generally in the order of about 200 to 300 pounds per square foot of catalyst surface per minute as measured at about 7 atmospheres. Although a gauze catalyst is generally employed in catalytic ammonia oxidation, the catalyst can be also in the form of perforated plates, strips, or other suitable structures. In any event it comprises a precious metal usually platinum or an alloy of platinum with another precious metal. Exemplary alloys are platinum-rhodium or platinum-iridium, either alone or containing other non-precious metals or materials.

A major problem in respect to the use of precious metal catalysts at elevated temperatures such as those above described, has been metal loss, which increases in general with severity of catalytic reaction conditions. Thus, the amount of catalyst metal lost increases with increasing temperature and increasing rate of production and some catalysts suffer greater metal losses than others due to differences in ability to withstand attack by the gases.

Such losses represent a substantial monetary loss due to the high cost of the catalyst metal. For instance, processes for oxidizing ammonia to nitrogen oxides involve operation at relatively high temperatures and at a relatively high rate of production, and the metal losses therein encountered are often as high as 2.2 troy ounces, or higher, per 100,000 pounds of ammonia burned.

The recovery of precious metals from gas streams, such as effluent from a catalytic oxidation above described, has been possible heretofore only at low efficiency levels. The difficulties encountered in coping with the problem have been associated with the wide range of particle size of the suspended metal particles and with the pressure drop developed across the separating system. Thus, when employing a filter capable of arresting fine particles the result has been a high pressure drop which in turn has adversely affected the catalytic reaction. On the other hand, when employing a filter of sufficient porosity to maintain a low pressure drop across the same, metal fines have escaped recovery with concomitantly low recovery efficiency. Attempts to support the filter at a higher than normal packing density have been unsuccessful as a means for effecting improved recovery efficiency.

This invention is concerned with the removal of precious metals from fluids containing same utilizing refractory fibrous "wool" materials, in a novel manner, as a filter body under improved low pressure drop conditions and is advantageously applied to the recovery of precious metals from effluents from an ammonia oxidation system employing precious metals, singly or alloyed, as a catalyst. The invention is further concerned with a novel means for supporting such wool filter materials so that no gas can by-pass the filter body along its perimeter. The invention in a now-preferred form is applied to the recovery of platinum from gas effluent from catalytic ammonia oxidation employing a platinum-rhodium gauze catalyst.

An object of the invention is to provide apparatus for removal of metal particles from fluids containing same. Another object is to provide for the recovery of platinum, or platinum alloy, particles from effluents of an ammonia oxidation system employing platinum or a platinum alloy as a catalyst. Another object is to provide for the utilization of refractory fibrous wool materials in a novel manner in the removal of precious metals from fluids containing same. Still another object is to provide apparatus for supporting a refractory fibrous wool body in operating position in the utilization of same as a filter body for the removal of metal particles from gases containing same. Other objects and aspects will be apparent from the accompanying disclosure and the appended claims.

In accordance with the invention, an improvement in a filter assembly for the recovery of metals from fluids containing same is provided, which comprises a plurality of contiguous fibrous wool layers, as an elongated filter body, characterized by density values alternately increased and decreased. Also, in accordance with the invention is provided a method for the separation of metal particles from a gas stream containing same, which comprises passing said stream through an elongated filter body comprising a plurality of contiguous fibrous wool layers characterized by density values alternately increased and decreased.

Further in accordance with the invention, an assembly is provided for supporting a filter body of contiguous fibrous layers, which comprises an open-end chamber containing perforations in a wall opposite the open end thereof; a vessel-shaped open end support member adapted to be disposed within said chamber and containing perforations opposite its open end; means for securing said vessel-shaped member within a portion of said chamber, with the perforate section thereof in open communication with the perforate section in said chamber wall; and means for closing the space between said support member and said chamber in an area in close proximity to the open end of said chamber, when said support member is secured as described. Still in accordance with the invention is provided a method for supporting a plurality of contiguous fibrous wool layers as a filter body which comprises disposing the said body to receive flow of fluid to be filtered, extending each of the ends of said body in a direction opposite that of said fluid flow and terminating same in the resulting extended position, and covering the terminated ends of said body layers so as to thereby deflect fluid flow from direct contact with said ends during filtration.

One embodiment of apparatus for the recovery of metal particles from fluids containing same comprises a chamber; a first conduit, as a fluid inlet, in a wall of said chamber; a second conduit, as a fluid outlet, also in a wall in said chamber and spaced apart from said first conduit; an elongated conduit member within said chamber, open at one end and closed at the other end and containing a plurality of openings in a side wall thereof, and said elongated member connecting at its open end with said outlet conduit; a plurality of contiguous layers of a refractory fibrous wool material, as a body, supported in closed communication with the said plurality of openings and comprising a first, second and third layer disposed successively toward said openings; said first and third layers in free uncompressed form being characterized by a density lower than that of said second layer, and said plurality of contiguous layers, as said body, being compressed to a volume of from about 25 to 60 percent of its free uncompressed volume.

One embodiment for separating metal particles from a gas stream containing same in suspension comprises the steps of supporting a plurality of layers of a refractory fibrous wool material in contiguous relationship as a filter body; maintaining a first and a third of said layers at a density, in their free uncompressed form, lower than that of a second and intermediate layer; maintaining the thickness of said filter body compressed to from about 25 to 60 percent of its free uncompressed thickness; and passing the said gas stream initially through said first layer and then through said second and third layers at a temperature above the condensation temperature of any material in the said gas stream which is condensable to liquid at normal temperatures and pressures; and recovering metal particles retained within the said filter body.

One embodiment of apparatus for retaining a plurality of fibrous wool layers as a filter body comprises a chamber open at one side, and a perforate section in a wall of said chamber opposite said open side; a vessel shaped support member for retaining such a body in said chamber, open at one side, and a perforate section in a wall of said support member opposite the open side thereof; said support member being dimensioned so as to provide for insertion of same into said chamber through the open chamber side while the perforate wall of said support member is in a plane substantially parallel to the plane containing said perforate chamber wall; means for securing said vessel in spaced apart relationship with the perforate chamber wall when at least a portion of said support member is extended into said chamber, as described; and a lip member around said support member, in close proximity to the open end thereof, extending outwardly from said vessel sufficiently to contact the walls of said chamber adjacent the open end when said vessel is secured in said spaced relation.

One embodiment for supporting a plurality of layers of fibrous wool material as a filter body for the filtration of fluids, comprises disposing the said layers in contiguous parallel relationship in a plane normal to the direction of flow of fluid through the said body and extending each of the ends thereof in a direction opposite that of said fluid flow and terminating same in the resulting extended position, compressing the entire mass of contiguous layers, as a body, so as to reduce the thickness of the said body by 25 to 60 percent of its thickness when in free uncompressed form, and covering the terminated ends of the said body layers so as to thereby deflect fluid flow from direct contact with said ends during filtration.

The invention is further illustrated with reference to the attached drawings of which FIGURE 1 is an elevation in section of a preferred embodiment of the recovery apparatus of the invention; FIGURE 2 is a plan view taken along the line 2—2 of FIGURE 1; FIGURE 3 is an isometric view of a preferred form of support member for maintaining a plurality of layers of filter material, compressed, in the device of FIGURE 1; FIGURE 4 is an elevational view illustrative of the position of the support element of FIGURE 3 prior to moving same into its supporting position; and FIGURE 5 is a section of a portion of the apparatus of FIGURE 1 taken along the line 5—5 of FIGURE 2 illustrating a screen element for precluding migration of fibrous material from the filter layers.

With reference to FIGURES 1 and 2, elongated chamber 10 contains inlet conduit 11 at end 12 and outlet conduit 13 at the opposite end 14. A pair of elongated plate members 16 and 17 containing perforations 18 distributed on their respective surfaces are longitudinally disposed within chamber 10 in face to face relation to form a central section 19 unobstructed to free flow of gases therethrough. Plate members 16 and 17 are preferably in substantially parallel axial relationship with each other and with chamber 10, and supported in part by connecting supports 21. Plates 16 and 17 are sealed at one end to flange member 22 and are supported from flange 22 and extend toward opposite end 12 of chamber 10 in contact with base closure plate 23. Base plate 23 is a part of closure cap 24 which closes central chamber section 19 and extends as an apron 24 below plates 16 and 17 toward the inner wall of chamber 10. Plate members 16 and 17 are directly opposite each other and are preferably disposed in parallel planes.

Plate members 16 and 17 each form a chamber 16a and 17a with adjacent walls 16' and 17', respectively, the chamber having an open end opposite the perforations 18. Walls 16a and 17a are supported by plates 26 and 26' sealed thereto and extending from base plate 23 to flange plate 22. Plates 26 and 26' serve also with chamber 16a and 17a to close the central chamber section 19 to form an elongated conduit member within chamber 10 containing perforated plates 16 and 17 as side wall portions. Section 19 is in direct communication via perforations 18, with conduit 11, and with conduit 13 through the opening 20 in flange 22.

A plurality of contiguous refractory fibrous wool layers 27a, b, c, d, and e are supported as a filter body in each of members 16a and 17a against each of perforated plates 16 and 17 encompassing perforations 18 in each instance. A screen member 28 is disposed intermediate each perforated plate 16 and 17 and the fibrous layers 27 associated therewith, when desired, to protect against migration of any fibrous materials 27 into central section 19.

Layers 27 in successive order, toward perforations 18, in each of chambers 16a and 17a, are alternately low density and high density refractory fibrous wool materials. The thickness of the high density layer is preferably maintained at a value as low as efficiency will permit and the thickness of the low density layer is maintained preferably at a value as high as possible without development of unduly high pressure drop across the body of layers. The thickness of any low density layer will generally be in a ratio to that of any high density layer within a range of about 0.5:1 to about 3:1. As applied to ammonia oxidation, when the filter body is connected with the oxidation system under reaction pressure the selected thickness values are such as will afford a pressure drop across the filter body not in excess of that which will adversely affect the oxidation reaction, such as from 1–6 p.s.i., prior to compression.

Thickness of the high density layer will generally be from about ¾ to 2½ inches, the corresponding thickness of the low density layers being somewhat more variable such as within the range of from about ½–4 inches. Generally, the low density layer is thicker than the high density layer in order to more efficiently correct for channeling that might otherwise take place and to more suitably support the low density layers. However, it is advantageous in some instances to utilize a high density layer as the first or initially contacted layer, in which case that particular high density layer can be somewhat thicker than any other high density layer.

Density of the fibrous layer materials will, of course, vary, dependent upon the specific material. Thus, when employing glass wool as layers 27 the low density layers, uncompressed form, are generally characterized by a density in the range of about ¼ to ¾ pound per cubic foot and the high density layers are characterized by a density in the range of from 2½ to 3½ pounds per cubic foot. In any event, the low density material, uncompressed form, will generally be characterized by a density within the range of ⅛ to ⅞ pound per cubic foot, the high density material generally being characterized by a density in the range of about 2 to 4 pounds per cubic foot.

In order that high efficiencies be achieved and low pressure drop be maintained across the filter body, it is necessary that the cross-sectional area of the filter body be at least 0.25 square foot per 100 cubic feet per minute (NTP) of gas passed through it, a now-prefered total gas velocity being in the order of about 265 cubic feet per minute per square foot of filter body area.

Elongated perforate plate members 29 and 31 are longitudinally spaced, in members 16a and 17a, away from plates 16 and 17 respectively and are disposed to be secured therein to support the layers 27 in a state of compression against perforations 18, and screen 28 when the latter is employed. Perforate plate 29 is connected at each end with a wall element 32 extending in about the same direction as that of walls 16' and 17', i.e., to form a preferred support member 35 for the plate body in chamber 16a, open at its end opposite the perforations in plate 29. Walls 32 are in turn connected with a flange or lip member 32' around the entire support member in close proximity to its open end extended away from the support member toward walls 16' and 17'. As shown with reference to FIGURE 4, layers 27 are disposed in uncompressed form within vessel 16a, and plate 29 with associated wall and lip members 32 and 32' (support member 35) is in position to be moved toward plate 16 in a plane substantially parallel to that containing perforations 18 in plate 16 to compress layers 27. Screw clamp assembly 34 is adapted to secure plate 29 in compressing position when plate 29 is moved toward plate 16 to effect compression of layers 27. Assembly 34 comprises an L-shaped member 36 having one side affixed to member 32' and positioned so as to dispose its side 36' in close proximity to wall 16' when plate 29 is moved toward plate 16 so as to compress layers 27, and to be secured in that position by extension of screw 37 through threaded openings 38 and 39. It is to be understood that plate 31 as an element of support member 35' is supported against fibrous layers 27 in vessel 17a in a manner the same as that for supporting plate 29 against layers 27 in vessel 16a, the latter specifically illustrated with reference to FIGURES 3 and 4.

In operation in accordance with a now-preferred embodiment, effluent from an ammonia oxidation system 8 containing a platinum-rhodium alloy (90:10, weight basis) as the oxidation catalyst, at a catalyst temperature of from about 900 to 1050° C. and containing suspended particles of platinum say of from about 2 to 3 ounces per 100,000 pounds ammonia burned is passed at its existing linear flow rate into recovery system 9 through conduit 11, around closure 24, into annulus 25 and then through perforations 30 of plates 29 and 31, compressed layers 27, screen 28 and perforations 18 into central chamber section 19 for withdrawal via conduit 13.

The invention is further illustrated with reference to the following example:

A filter system comprising a body of fibrous layers, supported and then compressed such as illustrated with reference to FIGURE 4, was utilized in the filtration of metal particles from effluents from an ammonia oxidation system employing a 90/10 platinum-rhodium catalyst gauze. The rate of total feed of gas flow to the catalyst zone was 5235 cubic feet per square foot of gauze cross section per minute at a pressure of 109# at about 890° C.

Disposed in the direction of gas flow, the fibrous layers were:

(1) A two inch layer of fiber glass insulating wool (nominal density=3# per cubic foot)
(2) A one inch layer of fiber glass insulation (nominal density=½# per cubic foot)
(3) A one inch layer of fiber glass insulating wool, the same material as that of the said two inch layer and
(4) A one inch layer of fiber glass insulation the same material as that of the said second layer.

Compression of the five inch (in uncompressed form) layer reduced the thickness of the over-all body from five inches to 1¾ inches, the thickness of the body at initiation of the filtration operation.

At the end of the on-stream (about 600 hours), the layer body had been additionally compressed by flow of gases therethrough. Thus, the final thickness of the first (2 inch) layer was about ⅝ inch; of each of the second and fourth layers was about ⅛ inch; and of the third layer was about ¼ inch.

The layers in their "tucked in" position were then removed from the system and examined. A substantially color-free zone at the perimeter of the body along the terminating edge of the filter body, i.e., about ½ to 1 inch thick, was noted indicating that there had been no by-pass of the filter body along its perimeter. Most of the particles filtered from the gas were found deposited upon the initially disposed 2 inch (high density) layer with some penetration into the first 1 inch layer, but none passed the latter layer, indicating that the filter could have been utilized for an additional operating period in the order of about 200 hours without there having been bypass of the body by gases fed to it or until the pressure drop across the filter increases to between 5 and 6 p.s.i.

Apparatus of FIGURE 1 is advantageously inserted in the effluent line from the oxidizer at a point relatively close to the oxidation chamber and at a point at which the temperature of the gases is still sufficiently above the condensation temperature of any material in the gas stream which is condensable to liquid at normal temperatures and pressures. Gases flowing into annulus 25 are prevented from flowing directly into conduit 13 by flange plate 22 which diverts total flow via perforations 18, central section 19 and outlet conduit 13.

It has been found that the above-described arrangement of refractory fibrous layers provides for filtration of precious metals from gases at markedly higher efficiencies than have been achieved heretofore. Thus, the defined filter body serves by way of low density layer $e$ to remove the largest of the suspended metal particles from the stream and at the same time to remove any solid or liquid impurities so that the gas passing from layer $e$ into high density layer $d$ has been freed from any materials which might otherwise cause unduly high pressure drop in the high density layer. Also, layer $e$ provides for a uniform distribution of gases so that the surface of layer $d$ is uniformly contacted for maximum capacity. Accordingly, layer $d$ because of its high density characteristics functions to remove the fine metal particles from the stream and does so at maximum capacity by virtue of the cooperative functions of low density layer $e$. Gases passed from contact with layer $d$ are passed through low density layer $c$ which although it may retain some metal particles serves primarily to effect a redistribution of the gases so as to correct channeling that otherwise takes place and deliver the gases uniformly to the surface of the layer $b$ so that high density layer b operates at a maximum capacity and improved high efficiency. Low density layer a serves to support layers b—e in operative position without imposing an unduly high pressure drop across the system. It is the combination of low density and high density layers as described that provides for the high separation efficiencies achieved in the practice of the invention.

It is to be noted that in many instances a combination of layers a, b and c will provide a highly efficient separation of metal particles from the gas, layers d and e serving to increase capacity, and in many instances provide higher efficiency of separation, when operating at the higher gas flow rates. Thus, when operating an ammonia oxidation system at flow rates in the order of 6000-7000 standard cubic feet per minute, the additional fibrous layers d and e are advantageously employed.

When desired, a plurality of filter devices of this invention can be disposed in parallel so that at least one is always on stream. The filter system is generally operated without interruption for a period of from one to several months. As applied to ammonia oxidation, the need for change is due in some instances to varying conditions in the oxidizer resulting in delivery of liquids to the filter or in temperature so high as to bring about fusion of some of the fibrous material, to cause nonuniform flow of gases and concomitantly lowered efficiency. The cartridge element, i.e., inner conduit assembly containing the filter bodies 27, are at such time removed from the chamber 10 and the filter layer 27 is transferred to a metal extraction step generally involving the use of well-known chemical means such as reaction of the metal with aqua regia and ultimate recovery of the metal.

In the removal of the inner cartridge unit, flange assembly 41 is dismantled and the top unit 42 is removed so that the said cartridge assembly can be raised by any suitable means such as one utilizing bail 43 for pulling the cartridge.

As further illustrated with reference to FIGURE 3 plate member 29 with wall 32, flange 32' and perforations 30 can be inserted against layers 27 and subsequently removed therefrom in a very simple manner. Plate member 31 can be similarly disposed in member 17a.

It is an important feature of the invention that the filter body is supported in a manner so as to prevent any by-passing of the body, by gases fed to it, along a path intermediate its perimeter and its supporting member. I have found that unless extended portions of the fibrous layers are "tucked in," in compressed form, between supporting members, as illustrated, and the terminated ends covered, such as by elements of the drawings, significant proportions of the gas will by-pass the fibrous body, with concomitant loss in precious metal recovery. Thus, when supporting the fibrous body by a frame of stainless steel wire screen to provide the necessary tension for maintaining the desired compression, a significant proportion of gas passed to the filter has been found to by-pass the wool body along its perimeter as above described, to the extent that the overall efficiency will vary according to the extent of the by-passing.

Another important feature of the fibrous wool body supporting structure of the invention is the ease which it provides in the installation and replacement of the filter body. Thus, to intall the body, it need only be inserted in place with the layer ends extended as illustrated, e.g., in element 16a, and then compressed by moving the corresponding element against the wool body so as to "tuck in" the extended ends as above described, and then clamping the compressed element in place such as illustrated by means 34, FIGURE 4. The filter body can be removed, simply, in the reverse order, i.e., by disengaging the clamping means, removal of the corresponding element and recovery of the filter body. Support assemblies 34 are sufficient for supporting the assembly of FIGURE 3 in position.

When employing aqua regia in the recovery of the metal, the resulting metal solution is evaporated, the nitroso compounds of the platinum are destroyed by repeated evaporation with hydrochloric acid and finally the platinum solution is filtered and the platinum is precipitated with ammonium chloride as $(NH_4)_2PtCl_6$ which is ignited and transferred into platinum sponge. Other precious metals which may have gone into the solution are precipitated with zinc and the concentrates are refined. If small amounts of rhodium, iridium and ruthenium are not dissolved in the aqua regia the material to which such metals still adhere can be subjected to a smelting and refining process.

Although ammonia oxidation is a process to which the invention is advantageously applied, it is applicable to the recovery of precious metals lost from precious metal catalysts used in the conversion of gases other than ammonia, so long as the precious metal catalyst is operated at elevated temperatures. Exemplary of another such process reaction at high temperature in the presence of a precious metal catalyst is that of a mixture containing ammonia, hydrocarbons, and oxygen, to produce hydrogen cyanide or hydrocyanic acid.

The materials from which the filter units of this invention are constructed will depend largely upon the particular process for which the unit is to be utilized. In the manufacture of oxides of nitrogen, it has been found desirable to make all parts of the filter units from stainless steel to resist the highly corrosive action of the products. The filter layer materials may be of any of a number of fibrous refractory wool materials such as glass wool, quartz wool, rock wool, fibrous asbestos, or a combination of such materials intermixed or in separate layers. Of these materials glass wool and quartz wool are preferred while asbestos is the least desirable because of its tendency to pack after continued operation, thus increasing resistance of the unit to the gas flow.

As will be evident to those skilled in the art, various modifications can be made or followed, in the light of the foregoing disclosure and discussion, without departing from the spirit or scope of the disclosure or from the scope of the claims.

What I claim and desire to protect by Letters Patent is:

1. A chamber; a first conduit, as a fluid inlet, in a wall of said chamber; a second conduit, as a fluid outlet, also in a wall of said chamber and spaced apart from said first conduit; an elongated conduit member within said chamber open at one end and closed at the other end and containing a plurality of openings in a side wall thereof, and said elongated member connecting at its open end with said outlet conduit; a plurality of contiguous layers of a refractory fibrous wool material, as a body, and means for supporting same in closed communication with the said plurality of openings and comprising a first, second and third layer disposed successively toward said openings; said first and third layers, in free uncompressed form being characterized by a density lower than that of said second layer, and said plurality of contiguous layers, supported as said body, being compressed to a volume of from about 25 to 60 percent of its free uncompressed volume; said plurality of layers also including a fourth and fifth layer in the said successive order, said fifth layer being characterized by a density, in free uncompressed form, lower than that of said second and fourth layers, and said first, third and fifth layers having a density, in free uncompressed form, within the range of about 1/8 to 7/8 lb. per cubic foot; and said fourth layer being characterized by a density higher than that of first and third layers, and said second and fourth layers having a density, in free uncompressed form, within the range of about 2 to 4 lbs. per cubic foot.

2. Apparatus of claim 1 wherein said refractory fibrous material is a glass wool.

3. Apparatus of claim 1 wherein said refractory fibrous material is a quartz wool.

4. Apparatus of claim 1 wherein the said density of said first and third layers is within the range of from ¼ to ¾ pound per cubic foot and the said density of said second layer is within the range of from 2½ to 3½ pounds per cubic foot.

5. Apparatus of claim 1 wherein the ratio of thickness of each said low density layer to that of the said high density layer is within the range of 0.5:1 to 3:1.

6. Apparatus of claim 1 wherein at least one elongated perforate plate member is extended into said elongated conduit member, in substantially parallel axial relationship therewith, as a portion of said side wall.

7. Apparatus of claim 1 containing an elongated perforate plate member within said chamber, outside said elongated conduit member and extended in parallel axial relationship with the said conduit wall portion containing said openings, and spaced away from said elongated conduit member; said body of layers being disposed between said conduit wall openings and the said plate member; and means for supporting the said plate member against said plurality of layers so as to maintain said layers in the said compressed state.

8. Apparatus for the recovery of precious metals from gases containing same, comprising an elongated chamber; fluid inlet conduit means in one end of said chamber and fluid outlet conduit means in the other end of said chamber; a pair of elongated members within said chamber disposed in substantially parallel axial relationship with each other and with said chamber, and each containing perforations along at least a major portion of its length and spaced apart to dispose said perforate portions in face to face relationship to form side walls of a central chamber section unobstructed to gas flow; means for closing said central section and for connecting same at one end with the said outlet conduit; a pair of support members, in said chamber, each containing a perforate wall portion and spaced away from said central section and encompassing a perforate portion of one of said elongated members, and in a plane substantially parallel with those containing said elongated members; each said support member being disposed to be moved, in its longitudinal position, toward the said perforate portion of one of said elongated members; a plurality of contiguous layers of a refractory fibrous wool material, as a body, supported intermediate the perforate portion of each of said elongated members and the support member encompassing same and comprising first, second, third, fourth and fifth layers disposed successively toward said elongated member; said first, third and fifth layers in free uncompressed form being characterized by a density lower than that of said second and fourth layers and in the range of from ⅛ to ⅞ pound per cubic foot, and said second and fourth layers being characterized by a density in the range of 2 to 4 pounds per cubic foot; said plurality of contiguous layers, as said body, being compressed to a volume of from about 25 to 60 percent of its original uncompressed volume; the thickness of any one of said first, third and fifth layers in the said compressed form being in a ratio to that of either of said second and fourth layers, within the range of from about 0.5:1 to 3:1; and means for maintaining each said support member in close direct contact with each said body of layers so as to maintain said layers in the said state of compression.

References Cited in the file of this patent
UNITED STATES PATENTS

| | | |
|---|---|---|
| 1,395,833 | Kling et al. | Nov. 1, 1921 |
| 1,405,399 | Donaldson | Feb. 7, 1922 |
| 1,560,790 | Jordahl | Nov. 10, 1925 |
| 1,807,521 | Foulk | May 26, 1931 |
| 1,943,592 | Farmer | Jan. 16, 1934 |
| 2,020,903 | Nickelsen | Nov. 12, 1935 |
| 2,207,660 | Ducker et al. | July 9, 1940 |
| 2,443,238 | Glanzer | June 15, 1948 |
| 2,771,153 | Hennig | Nov. 20, 1956 |
| 2,886,124 | Scharmer | May 12, 1959 |